United States Patent [19]

Ross et al.

[11] Patent Number: 5,262,457

[45] Date of Patent: * Nov. 16, 1993

[54] UNSATURATED POLYESTER RESIN COMPOSITIONS CONTAINING COMPATIBLE COMPOUNDS HAVING ETHER SUBSTITUENTS

[75] Inventors: Louis R. Ross; Edward L. Wilson, both of Newark, Ohio

[73] Assignee: Owens-Corning Fiberglas Technology Inc., Summit, Ill.

[*] Notice: The portion of the term of this patent subsequent to Feb. 18, 2009 has been disclaimed.

[21] Appl. No.: 3,754

[22] Filed: Jan. 13, 1993

Related U.S. Application Data

[63] Continuation of Ser. No. 733,515, Jul. 22, 1991, abandoned.

[51] Int. Cl.$^5$ .............................. C08L 67/00
[52] U.S. Cl. ...................... 523/500; 525/33; 525/35; 525/41; 528/296
[58] Field of Search ............... 523/504; 525/33, 35, 525/41; 528/296

Primary Examiner—Paul R. Michl
Assistant Examiner—U. K. Rajguru
Attorney, Agent, or Firm—Ted C. Gillespie; Charles H. Ellerbrock

[57] ABSTRACT

A sheet molding composition is disclosed which includes a four component resinous system which comprises (a) an unsaturated polyester comprising a polycondensation product of one or more dihydric alcohols and one or more ethylenically unsaturated polycarboxylic acids; (b) one or more low-profile additives which are thermoplastic polymers which cause phase separation and porosity during the curing reaction; (c) one or more olefinically unsaturated monomers which copolymerize with the unsaturated polyester; and, (d) one or more compatible components comprising at least one compound containing one or more ether substituents. The compatible component is compatible with the reacted unsaturated polyester and monomer during cure and imparts improved surface characteristics when added to low-profile resin systems.

9 Claims, No Drawings

UNSATURATED POLYESTER RESIN COMPOSITIONS CONTAINING COMPATIBLE COMPOUNDS HAVING ETHER SUBSTITUENTS

This is a continuation, of application Ser. No. 07/733,515, filed Jul. 22, 1991, now abandoned.

TECHNICAL FIELD

The present invention provides unsaturated polyester resin compositions that contain one or more unsaturated polyesters, ethylenically unsaturated monomers that copolymerize with the unsaturated polymer, thermoplastic low-profile additives and compatible compounds.

Unsaturated polyester resin compositions are finding increased use in the automotive industry as sheet molding compound (SMC) formulations from which component parts especially body panels can be molded. The unsaturated polyester resin compositions contain, in addition to the unsaturated polyesters and monomer components, so-called "low-profile" additive components which are thermoplastic polymers that act to prevent undesirable shrinkage as the composition is being molded into a thermoset article. Low-profile additives are added to unsaturated polyester resin compositions in order to obtain a composition which can be used in a sheet molding formulation and molded into thermoset articles. The surfaces of the molded articles truly reflect the surface characteristics of the mold.

Two types of low-profile systems are commonly used commerically, one-pack and two-pack. In one-pack systems, the unsaturated polyester, monomer and low-profile additive components are mutually compatible, i.e., no gross separation occurs when a mixture of the components is allowed to stand. In contrast, two-pack systems form distinct phases if the components are allowed to stand after being mixed. As such, the components need to be mixed immediately prior to use. In both systems, phenomena occur that allow these resins to microscopically compensate for shrinkage.

It is the ability of the low-profile resins to compensate for shrinkage that leads to the usefulness of these resins. This shrinkage compensation is largely a result of a micro-phase separation that occurs in these unsaturated polyester resin systems. The micro-phase separation occurs during the cure phase for both the one-pack and two-pack systems. Prior to cure the low-profile additive is at least partly soluble in the polyester/monomer solution. As the polyester/monomer mixture crosslinks, the low-profile thermoplastic additive and copolymer (of polyester and monomer) become increasingly less compatible and a two-phase (domain-matrix) type morphology results. This micro-phase separation leads to the formation of a porous structure as the opposing internal stresses of thermal expansion and polymerization shrinkage occur. In many unsaturated polyester resin compositions the porous structure is a result of microfracturing of the curing resins which gives rise to void formation. Unsaturated polyester resin compositions have been developed which have essentially zero shrinkage and which, in fact, expand upon curing.

In addition to unsaturated polyester resins, the sheet molding compound formulations typically contain other ingredients including, for example, chemical thickeners. In such formulations, a chemical thickener such as an alkaline material (for example, magnesium oxide or magnesium hydroxide) is added to an uncured polyester along with fillers, glass fiber, and other standard materials. The alkaline material interacts with the residual acidity in the polyester and, usually, the low-profile additive to increase the viscosity of the composition. This process is referred to as maturation and usually takes several days. If two-pack resin systems are used, care has to be taken to avoid gross phase separation. After the maturation process is complete, the thickened formulations are handlable and can easily be placed into compression molds either by hand or by machine.

Although the use of low-profile additives does effect some degree of improvement in the anti-shrinkage characteristics of the unsaturated polyester compositions, it has now been found that significant improvements in surface smoothness and processing characteristics can be achieved by adding a component which is compatible with the reacted unsaturated polyester and monomer during cure.

BACKGROUND ART

Low-profile resins have been described that contain unsaturated polyester resins, thermoplastic low-profile additives, and a polymerizable monomer, usually styrene. In addition to these components other materials have been added to low-profile systems to improve specific properties.

The Iseler, et al. U.S. Pat. No. 4,622,354 describes "phase stabilizing agents" that comprise a select group of compounds from three classes: fatty acids, dimer acids and polyester polyols. When used in an SMC formulation where the thermoplastic low-profile additive is polymethylmethacrylate and a urethane prepolymer is included, the phase stabilizing agent reduces the gross separation that occurs during the maturation process. The resin compositions described by Iseler et al. are two-pack systems that formerly phase-separated during maturation prior to the addition of the phase stabilizers.

The Ochsenbein et al. U.S. Pat. No. 4,473,544 describes an anti-shrink additive with a tri- or tetrafunctional polyether condensation product of propylene oxide or a triol or tetrol wherein the condensation product is acidified in such a manner that it possesses at least one terminal acidic functional group per elementary molecule. This material is used as a low-profile additive.

The Atkins U.S. Pat. No. 4,555,534 describes lowshrink pigmentable unsaturated polyester resins which comprises a polyester resin comprising the reaction product of an olefinically unsaturated dicarboxylic acid or anhydride and a polyol, an olefinically unsaturated monomer, a thickening agent, a pigment, a carboxylated vinyl acetate polymer low-profile additive, and a surface active compound. The Atkins '534 patent describes low-shrink resins having improved uniformity of pigmentation in internally pigmented thickened polyester molding compositions. These pigmentable resin systems are low-shrink, and not low-profile. The surface quality of these pigmentable systems is considerably inferior to surfaces required for automotive appearance applications.

Although the use of low-profile additives and thickening agents, as described, do effect some degree of improvement in the antishrinkage and surface smoothness characteristics of the unsaturated polyester compositions, it is still not possible to achieve the degree of surface smoothness required of today's thermoset molded articles.

DISCLOSURE OF INVENTION

The present invention provides low-profile resin compositions having improved surface smoothness which are useful for compression or injection molding into useful articles. In one aspect, the invention comprises an improved sheet molding composition that includes a four component resinous system comprising:

(a) an unsaturated polyester comprising a poly condensation product of one or more dihydric alcohols and one or more ethylenically unsaturated polycarboxylic acids;

(b) one or more low-profile additives comprising thermoplastic polymers which cause phase separation and porosity during the curing reaction;

(c) one or more olefinically unsaturated monomers which copolymerize with the unsaturated polyester; and, (d) one or more components which contain one or more ether substituents and are compatible with the reacted unsaturated polyester and monomer during cure.

The four component resinous system imparts improved surface smoothness when used with other known, conventional ingredients for low-profile resin systems used in making sheet molding compositions.

BEST MODE OF CARRYING OUT INVENTION

The present invention relates to the discovery of the use in a low-profile system of components which are compatible with the reacted unsaturated polyester and monomer during cure. When these compatible components are included in combination with low-profile additives and used in sheet molding compositions, articles with very smooth surfaces may be molded. Additionally, the flow of the sheet molding composition during the molding process is improved to the point that rapidly curing formulations may be composed. As a result, the molding time is drastically reduced.

The unsaturated polyester component of the four component resinous system comprises the polycondensation reaction product of one or more dihydric alcohols and one or more ethylenically unsaturated polycarboxylic acids. By polycarboxylic acid is generally meant the polycarboxylic or dicarboxylic acids or anhydrides, polycarboxylic or dicarboxylic acid halides, and polycarboxylic or dicarboxylic esters. Suitable unsaturated polycarboxylic acids, and the corresponding anhydrides and acid halides that contain polymerizable carbon-to-carbon double bonds may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples of which include Ophthalmic, isophthalic, terephthalic, succinic, adipic, sebacic, methylsuccinic, and the like. Dihydric alcohols that are useful in preparing the polyesters include 1,2-propane diol (hereinafter referred to as propylene glycol), dipropylene glycol, diethylene glycol, 1,3-butanediol, ethylene glycol, glycerol, and the like. Examples of suitable unsaturated polyesters are the polycondensation products of (1) propylene glycol and maleic and/or fumaric acids; (2) 1,3-butanediol and maleic and/or fumaric acids; (3) combinations of ethylene and propylene glycols (approximately 50 mole percent or less of ethylene glycol) and maleic and/or fumaric acid; (4) propylene glycol, maleic and/or fumaric acids and dicyclopentadiene reacted with water. In addition to the above described polyesters one may also use dicyclopentadiene modified unsaturated polyester resins as described in the Pratt et al. U.S. Pat. No. 3,883,612. These examples are intended to be illustrative of suitable polyesters and are not intended to be all-inclusive. The acid number to which the polymerizable unsaturated polyesters are condensed is not particularly critical with respect to the ability of the low-profile resin to be cured to the desired product. Polyesters which have been condensed to acid numbers of less than 100 are generally useful, but acid numbers less than 70 are preferred. The molecular weight of the polymerizable unsaturated polyester may vary over a considerable range, but ordinarily those polyesters useful in the practice of the present invention have a molecular weight ranging from 300 to 5000, and more preferably, from about 500 to 5000.

In preferred embodiments, the unsaturated polyester is present in amounts ranging from about 20 to 45 percent, by weight, based on the total four component resinous system comprising the unsaturated polyester, the low-profile additive, monomer and compatible component. Especially preferred concentrations of the unsaturated polyester are in the 28 to 35 percent, by weight, range.

The low-profile additive component of the four-component resinous system comprises thermoplastic polymers which cause phase separation and porosity during the curing reaction. Low-profile additives are materials that when mixed in an unsaturated polyester and cured, result in a multiphase system. If the low-profile additive and the unsaturated polyester are compatible (from the standpoint that a gross phase separation does not take place) before cure, the system is known as a one-pack. Those mixtures which tend to separate into two or more layers on standing are known as a two-pack resin systems. This does, however, necessitate mixing immediately before use. Some polymers that are useful as low-profile additives include homopolymers and copolymers of acrylic and methacrylic acid esters, cellulose acetate butyrate, vinyl acetate homopolymers and copolymers, polyurethanes prepared from polyisocyanates, preferably diisocyanates, and polyether polyols, numerous saturated polyesters, polycaprolactone, styrene-butadiene copolymers, some modified celluloses, and certain alkyl oxide polymers. The above list of low-profile additives is not intended to list all low-profile additives but rather to show examples of materials which have been used to cause the multiphase morphology present in low profile resins. In preferred embodiments the thermoplastic additive is present in amounts ranging from 5 to 30 percent, by weight, based on the total four component resinous system. Especially preferred concentrations of thermoplastic additive are in the 7 to 20 percent, by weight range.

In addition, low-profile additions such as the composition comprising ethylene glycol, at least one nonpolar diol, trimellitic anhydride, as disclosed in copending and commonly owned patent application Ser. No. 07/555,884, filed May 2, 1990, which is expressly incorporated hereby by reference, may also be used in the present invention.

The monomer component of the resinous system comprises materials that copolymerize with the unsaturated polyester. The olefinically unsaturated monomer that is copolymerizible with the unsaturated polyester is most generally styrene, however, methylstyrene is also useful. In preferred embodiments the monomer is present in amounts ranging from 25 to 65 percent, by weight, based on the total four component resinous system. Especially preferred concentrations of monomer are in the 35 to 50 percent, by weight range.

The compatible component of the four component resinous system comprises one or more materials which are compatible with the reacted unsaturated polyester and monomer during cure. The compatible component, when added to the unsaturated polyester/monomer combination does not cause the necessary microphase separation that occurs with low-profile systems; that is, the compatible components does not act like a low-profile system.

Examples of other useful compatible components are those compatible components containing one or more polyoxyethane substituents, as disclosed in the copending and commonly owned patent applications, Ser. No. 07/428,548, filed Oct. 30, 1989, now U.S. Pat. No. 5,089,544, Ser. No. 07/517,775, filed May 2, 1990, now U.S. Pat. No. 5,162,401, and Ser. No. 07/517,863, filed May 2, 1990, now U.S. Pat. No. 5,182,926, which are expressly incorporated herein by reference. These examples are intended to be illustrative of suitable compatible components and are not intended to be all inclusive.

In the present invention one or more components having ether substituents are added which are compatible with the reacted unsaturated polyester and monomer during cure. That is, they do not act as low-profile additives. They do not cause the microporous structure necessary fow low-profile additives. According to the present invention, these compatible components give the added benefits of surface smoothness and better flowability, when compared with low-profile resin compositions without the compatible components. In the preferred embodiments the compatible component is present in amounts ranging from 0.5 to 15 percent, by weight, based on the total four component resinous system. Especially preferred concentrations of the compatible components are in the 1 to 8 percent, by weight range.

The compatible components used in the present invention contain one or more ether substituents which has the general formula: O—R, wherein R is selected from the group consisting of hydrogen cycloalkyl, lower alkyl, phenyl, and phenyl substituted by: halogen, lower alkyl, acyl or lower alkoxy.

It is desirable that the molecular weight of the compatible component be less than about 2000, and in certain embodiments less than about 900; weight percent of the ether substituent be greater than or equal to 15, and in certain embodiments 10; and that the other atoms in the compatible component total less than about 150, and in certain embodiments 75.

The compatible components used in the present invention can also be defined to contain one or more ether substituents which has the general formula:

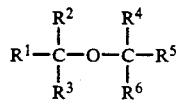

wherein $R^1$, $R^2$, $R^3$, $R^4$, $R^5$ and $R^6$ are selected from the group consisting of hydrogen, cycloalkyl, lower alkyl, phenyl, phenyl substituted by halogen, lower alkyl, acyl, or lower alkoxy; $R^1$, $R^2$, $R^3$, $R^4$, $R^5$ and $R^6$ may be the same or different.

The following terms used herein: "cycloalkyl", "lower alkyl", and "acyl" generally contain from 1 to 50 carbons, as is well understood by those skilled in the art.

The molecular weight of the compatible compound is compatible with the reacted unsaturated polyester and monomer during cure. Compatibility generally means that the combination of unsaturated polyester and compatible additive do not cause the microporous structure widely accepted as necessary for the low-profile phenomenon. Low-profile additive components, by definition, are incompatible with the curing unsaturated polyester and monomer, and cause a phase separation which leads to a microporous structure.

Examples that illustrate the applicability of this invention are listed in Table 1 below. These compatible components contain one or more ether substituents as defined in Formula I.

The four component resinous system of this invention is suitable for mixing with other ingredients in order to form a sheet molding composition. For example, the four component resinous system is suitable for mixing with chemical thickeners which are physically mixed into the resin emulsion. The chemical thickeners generally include metal oxides, hydroxides and alkoxides of Group II, III or IV from the Periodic Table. Calcium oxide and magnesium oxide or the respective hydroxides are most often employed with four component resin compositions of the present invention. In preferred embodiments, the thickener is present in amounts ranging from about 0.5 to about 6 parts, by weight, based on the four component resinous system. The thickener is generally suspended in a carrier resin, as is known in the art. In preferred embodiments the carrier material comprises a composition which does not react with the thickener such as, for example, polymethylmethacrylate, polyvinylacetate, saturated or unsaturated polyesters, and similar materials well-known in the art. In preferred embodiments the carrier resin is present in amounts ranging from about 0.5 to about 8 parts, by weight, based on one hundred parts of the four component resinous system.

Table II below illustrates the preferred ranges for the four component mixture described in this invention.

Catalysts are incorporated in small amounts into thermosetting polyester resins containing ethylenically unsaturated monomer to aid in curing or cross-linking the unsaturated polyester with the monomer. Such catalysts are well known and may be similarly utilized in this invention to aid in curing the unsaturated polyester and monomer mixed with the low-profile thermoplastic polymer. Typical catalysts, for example, include organic peroxides and peracids such as tertiary butyl perbenzoate, tertiary butyl peroctoate, benzoyl peroxide and the like. The amounts of catalysts may be varied with the molding process and similarly varied with the level and types of inhibitors utilized, in a manner well known in the art. In preferred embodiments the catalyst is present in amounts ranging from about 0.5 to about 2.5 parts, by weight, based on one hundred parts of the four component resinous system.

Curing of the composition is carried out under heat and pressure typically, in closed, preferably positive pressure type molds. Mold release agents may be added to the compositions to perform their normal function, as is well understood in the art. In preferred embodiments, the mold release agents are present in amounts ranging from about 0.5 to about 6.0 parts, by weight, based on one hundred parts of the four component resinous system.

Fibers, fillers and pigments normally added to resin compositions can be likewise used in formulating the sheet molding composition of this invention. Reinforcing fibers or fibrous reinforcement is taken to mean glass fibers in one form or another, such as glass fabrics, chopped glass strands, chopped or continuous strand glass fiber mat; however, the terms also include reinforcing agents which may also be used if desired, for example, asbestos, cotton, synthetic organic fibers and metals. Fillers, usually inert, and inorganic material useful with the compositions of the present invention include, for example, clay, talc, calcium carbonate, silica, calcium silicate, and the like. In preferred embodiments the fillers are present in amounts ranging from about 165 to about 250 parts, by weight, based on one hundred parts of the four component resinous system.

Examples of pigments include carbon black, iron oxide, titanium dioxide, and the like, as well as organic pigments. In preferred embodiments the pigments are present in amounts ranging from about 0 to about 4 parts, by weight, based on one hundred parts of the four component residous system.

In one aspect of the present invention the preparation of the sheet molding composition is generally carried out by blending together a first portion comprising the unsaturated polyester, the low-profile additive, the monomer, the compatible component, and such additives as a catalyst, mold release agent and fillers. This is generally known in the industry as the A-side formulation. The second portion (generally known as the B-side formulation) comprises the thickening agent and a carrier resin therefor, and such additives as pigments and mold release agents. In another aspect of the invention an additional or secondary monomer is added to the B-side formulation in which the thickener is suspended. In preferred embodiments the additional monomer comprises vinyl toluene or styrene. In preferred embodiments, the additional monomer is present in amounts ranging from about 1 to about 8 parts, by weight, based on one hundred parts of the four component resinous system.

The sheet molding composition of the present invention can be prepared by mixing the components in a suitable apparatus at temperatures which are conventional and known to those skilled in the art. Once the sheet molding composition is formulated, the composition can be molded into thermoset articles having a desired shape. The actual molding cycle will, of course, depend upon the exact composition being molded. In preferred embodiments suitable molding cycles are conducted at temperatures ranging from about 120°–177° C. for periods of time ranging from about ⅓ to about 5 minutes.

INDUSTRIAL APPLICABILITY

The following formulations are provided to illustrate examples of the compositions of the present invention and are not intended to restrict the scope thereof. All parts are parts by weight, unless otherwise expressly specified.

TABLE II

| | Resin Compositions | |
|---|---|---|
| Ingredients | Range (wt. %) | Preferred Range (wt. %) |
| Unsaturated polyester | 20–45 | 28–35 |
| Thermoplastic additive (low-profile) | 5–30 | 7–20 |
| Monomer | 25–65 | 35–50 |
| Compatible component | 0.5–15 | 1–8 |
| | 100 | 100 |

Various formulations using the sheet molding composition formulation shown in Table III below were made.

TABLE III

| Typical Sheet Molding Composition Formulation | |
|---|---|
| Ingredients | Amount |
| Resin | 100 |
| Catalyst | 1.4 |
| Release agent | 4.2 |
| Filler | 215 |
| Thickener | 3.7 |
| Pigment | 0.2 |
| Carrier | 1.9 |
| Secondary monomer | 3.7 |

In addition, the remaining ingredients were the same for each formulation: the unsaturated polyester comprises maleic anhydride and propylene glycol; the low-profile additive comprises a saturated polyester made from ethylene glycol and propylene glycol and adipic acid; the monomer comprises styrene; the compatible components are listed in Table I; the catalyst comprises tertiary butyl perbenzoate; the release agent comprises calcium stearate and zinc stearate; the filler comprises calcium carbonate; the thickener comprises magnesium hydroxide; the carrier comprising polymethylmethacrylate; the pigment comprises a carbon black pigment suspension; and the secondary monomer comprises vinyl toluene.

Compression molded panels were made with each formulation with 27 percent, by weight, of 2.54 cm chopped glass fibers. When measured on a surface smoothness index instrument (LORIA ® registered trademark of the Ashland Chemical Co.) the panels gave the LORIA ® number as listed in Table I below as compared to the same formulation but without any compatible component, which gave a number of 80–90. On the LORIA ® instrument, the lower the number, the smoother the surface. The compatible components listed in Table I below contain the ether substituent as described in this invention. It is within the contemplated scope of the present invention that the compatible components especially useful in the four component resinous system have a surface smoothness value within the ranges set forth in Table I below. In preferred embodiments, it is contemplated that the surface smoothness values of the four component resinous systems containing compatible components, be about 70 or less, as measured using a LORIA ® surface smoothness index instrument.

TABLE 1

| COMPATIBLE COMPONENT | COMMON OR TRADENAME | LORIA |
|---|---|---|
| Polypropylene glycol ceteareth-9 | Eumulgin L | 61 |
| Polyoxyethane-co-polyoxy- | Genapol PN-30 | 57 |

TABLE 1-continued

| COMPATIBLE COMPONENT | COMMON OR TRADENAME | LORIA |
|---|---|---|
| propane amine | | |
| Decaglycerol tetraoleate | Caprol 10G-40 | 43.5 |
| Polyalkoxylated quaternary amine | Cirrasol G-250 | 56 |
| Polyoxypropane (10) cetyl ether phosphate | Crodafog CAP | 01.5 |
| Sodium alkylaminopolyethoxy-ethyl sulfate | Triton OS-15 | 60 |
| Polyoxyethylated (5) Oleic Acid | Emulphor VN-430 | 44 |
| Polyoxyethylated (30) Caster Oil | Emulphor EL-620 | 41 |
| Polyoxyethylated (20) Oleyl Alcohol | Emulphor ON-870 | 43.5 |
| Ethoxylated Mono and Diglycerides | Durfax EOM K | 57 |
| Polypropoxylated (6) Phenol | POP (6) Phenol | 50 |
| 1,2,3-propanetriol homopolymer-octadecenote | Caprol 3G-1-0 | 42 |
| Ethoxylated Aromatic Alcohol Phosphate | Mazon JMR-1 | 66 |
| Ethoxylated-Propoxylated Linear Alcohol | Rexonic P-1 | 62 |
| Phosphated Alkylphenol Ethoxylate | Rexophos 25/97 | 76 |
| 88% Dimethyl Polyethylene Glycol 12% Acetate Silicone Copolymers | DowCorning FF-400 | 69 |
| 88% Polyoxyethyleneglycol Silicone Copolymer 12% Allyl Alcohol Ethoxylated | DowCorning 193 | 42 |
| Aromatic Alcohol (ethoxylated) Phosphate | Maphos JM-71 | 80 |
| Ethoxylated Linear Alcohol (40% E.O.) | Alfonic 1012-40 | 49 |
| Polyethoxylated (20) Glyceryl Stearate | Aldosperse MS-20-FG | 42 |
| Glycerol monolaurate | Aldo MLD | 66 |
| Polyethoxylated (10) Cetyl Ether | BRIJ 56 | 48 |
| Ethoxylated (20) Methyl Glucoside Sesquisterate | Glucamate SSE-20 | 45 |
| Polyethoxylated Lauramide MEA | Mazamide 1,-5 | 42 |
| Alcohols (C-10 to C-16) Ethoxylated | AE-3 | 44 |
| Alcohols (C-10 to C-16) Ethoxylated | AE-7 | 46 |
| Carboxylated Ethoxylated Alcohol | Emcol CBA-60 | 53 |
| Polyethoxylated (20) Oleyl Alcohol | ON870 | 44 |
| EO/PO Type Surfactant | Pluronic L-35 | 52 |
| EO/PO Surfactant | Pluronic L-64 | 58.2 |
| Polyalkyleneoxidemethyl-siloxane Copolymer | Union Carbide L-562 | 50 |
| Polyethoxylated (6) Bisphenol A | POE 6 Bisphenol A | 58 |
| Polypropoxylated (6) 2-Ethylhexanol | POP 6 -2 Ethylhexanol | 54 |
| Polypropoxylated (6) Nonylphenol | POP 6 Nonylphenol | 55 |
| EO/PO Surfactant | Pluronic L-63 | 61 |
| Polyoxyethylene (5) Sorbitan Monooleate | Glycosperse O-5 | 56 |
| Polyethoxylated (20) Sorbitan Monooleate | Flo Mo SMO-20 | 58 |
| Polyethylene Glycol M.W. 600 | Polyethyleneglycol MW 600 | 47 |
| Polytetrahydrofuran | PTMEG MW 650 | 56 |
| Polyethylene Glycol Monomethyl ether | PEGME | 53 |
| Polyethoxylated (5) Tallow Amine | TAM-5 | 58 |
| Polycaprolactone diol | Polycaprolactone diol | 63 |
| Polyethoxylated (20) Sorbitan Monooleate | Tween 80 | 56.2 |
| Polyethoxylated (5) Sorbitan Monooleate | Tween 81 | 55 |
| Nonylphenoxy Polyethoxy Ethanol | Triton N-57 | 52.9 |
| Octylphenoxy Polyethoxy Ethanol | Triton X-15 | 53.8 |
| Sorbitan monooleate | Alkamuls SMO | 58.6 |
| Polyoxyethylene Decyl Phosphate Potassium Salt | Ethfac 361 | 61 |
| Polyethoxylated (5) Laurate | Ethox ML-5 | 45 |
| Polyethoxylated (9) Laurate | Ethox ML-9 | 45 |
| Polyethoxylated (14) Laurate | Ethox ML-14 | 46 |
| Polyethoxylated (9) Isostearate | Ethox MI-9 | 51 |
| Polyethoxylated (14) Isostearate | Ethox MI-14 | 48 |
| Polyethoxylated (9) Oleate | Ethox MO-9 | 51 |
| Polyethoxylated (14) Oleate | Ethox MO-14 | 44 |
| Polyethoxylated Nonylphenol | Gedepar CO 210 | 59 |
| Polyethoxylated Nonylphenol | Alaksurf NP-15 | 47 |
| Ethoxylated Octyl Phenol | Triton X-45 | 59 |
| Ethoxylated Octyl Phenol | Triton X-102 | 53 |
| Polyoxyethane (15) Cocoamine | CAM-15 | 54 |
| Dibenzylether | Dibenzylether | 55.5 |
| Dipropyleneglycol Monomethylether | DPGMME | 50 |

In addition, the sheet molding compositions of the above formulations have shown unexpected improvements in surface aesthetics and mold fillout. These improvements are especially significant for use in sheet molding compound (SMC). Moreover, increasingly thinner automobile parts are able to be molded with smoother surfaces than by any known systems.

Although the invention has been described in its preferred form with a certain degree of particularity, it is understood that the present disclosure has been made only by way of example, and that numerous changes can be made without departing from the spirit of the scope of the invention.

We claim:

1. A four component resinous system for a sheet molding composition comprising:
   (a) an unsaturated polyester comprising a polycondensation product of one or more dihydric alcohols and one or more ethylenically unsaturated polycarboxylic acids;
   (b) one or more low-profile thermoplastic polymers which cause phase separation and porosity during a curing reaction;
   (c) one or more olefinically unsaturated monomers which copolymerizes with the unsaturated polyester, and,
   (d) one or more components which are compatible with the reacted unsaturated polyester and monomer during cure, wherein the compatible component is selected from the group of compounds containing one or more ether substituents having a general structure:

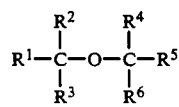

wherein $R^1$, $R^2$, $R^3$, $R^4$, $R^5$ and $R^6$ are selected from the group consisting of hydrogen, cycloalkyl, lower alkyl, phenyl, phenyl substituted by halogen, lower alkyl, acyl or lower alkoxy; $R^1$, $R^2$, $R^3$, $R^4$, $R^5$ and $R^6$ may be the same or different; and the weight percent of the ether substituent is greater than or equal to 10 percent of the compatible component and the other atoms in the compatible component is less than about 150, and the molecular weight is less than about 2000.

2. The composition of claim 1, wherein the weight percent of the ether substituent is greater than or equal to 15 and other atoms in the component total is less than about 75, and the molecular weight is less than about 900.

3. The composition of claim 1, wherein the compatible component is decaglycerol tetraoleate, 1,2,3-propanetriol homopolymer-octadecenote, dibenzyl ether, polyalkoxylated quaternary amine, glycerol monolaurate, polytetrahydrofuran, sorbitan monooleate, or mixtures thereof.

4. The composition of claim 1, wherein the unsaturated polyester comprises the polycondensation product of dihydric alcohols and an ethylenically unsaturated polycarboxylic acid.

5. The composition of claim 1, wherein the unsaturated polyester is selected from the group consisting essentially of a polycondensation product of maleic and/or fumaric acids and propylene glycol; the polycondensation product of 1,3-butanediol and maleic and/or fumaric acids; the polycondensation product of ethylene and propylene glycols comprising approximately 50 mole percent or less of ethylene glycol, and maleic and/or fumaric acids; the polycondensation product of propylene glycol, maleic and/or fumaric acids and dicyclopentadiene reacted with water; and the polycondensation product of propylene glycol, maleic and/or fumaric acids and isophthalic acid.

6. The composition of claim 1, wherein the low-profile thermoplastic polymer is selected from the group consisting essentially of a reaction product of ethylene glycol and propylene glycol and adipic acid; a polyvinyl acetate homopolymer or copolymer; and a polymethylmethacrylate.

7. The composition of claim 1, wherein the monomer is selected from the group consisting essentially of styrene, methyl-styrene, and vinyl toluene.

8. The composition of claim 1, wherein the unsaturated polyester is present in an amount of approximately 25–45 percent, the low-profile thermoplastic polymer is present in an amount of approximately 5–30 percent, the monomer is present in an amount of approximately 25–65 percent and, the compatible component is present in an amount of approximately 0.5–15 percent, by weight, of the four component resin.

9. The composition of claim 1, wherein the unsaturated polyester is present in an amount of approximately 28–35 percent, the low-profile thermoplastic polymer is present in an amount of approximately 7–20 percent, the monomer is present in an amount of approximately 35–50 percent and, the compatible component is present in an amount of approximately 1–8 percent, by weight, of the four component resin.

* * * * *